A. H. SIEGFRIED.
Metal-Boring Tools.
No. 150,197. Patented April 28, 1874.
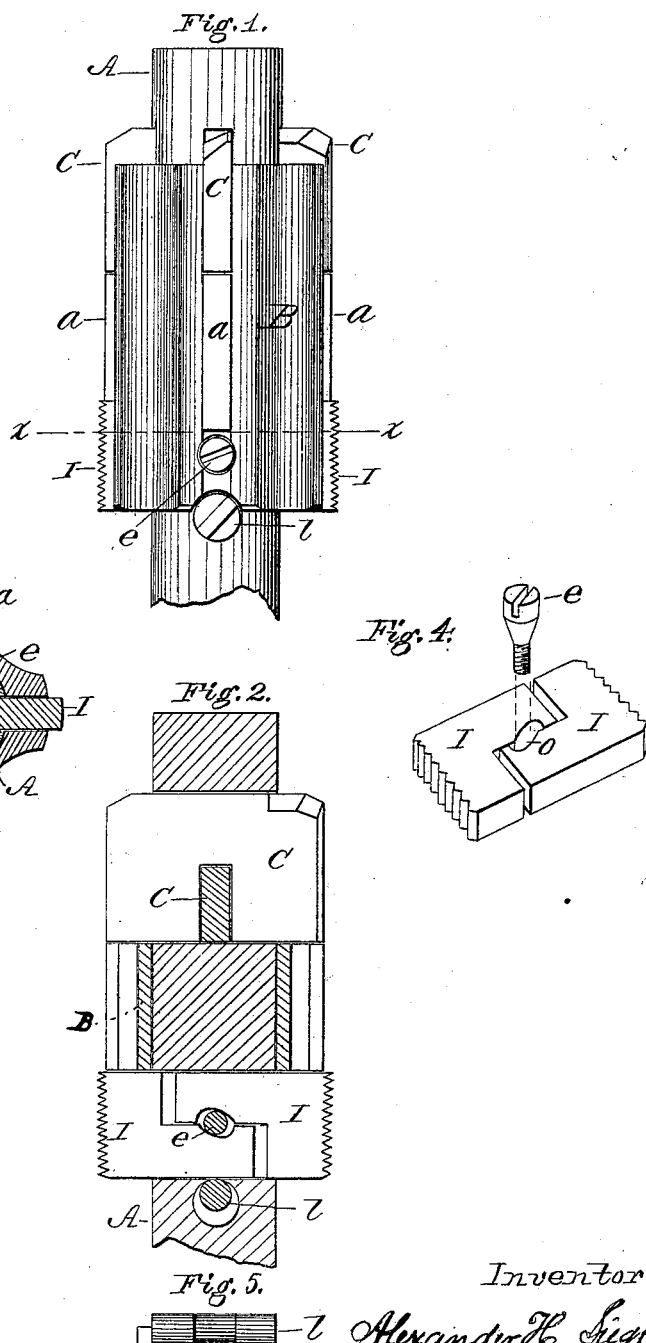

UNITED STATES PATENT OFFICE.

ALEXANDER H. SIEGFRIED, OF LEWISBURG, PENNSYLVANIA.

IMPROVEMENT IN METAL-BORING TOOLS.

Specification forming part of Letters Patent No. 150,197, dated April 28, 1874; application filed April 4, 1874.

*To all whom it may concern:*

Be it known that I, ALEXANDER H. SIEGFRIED, of Lewisburg, in the county of Union and State of Pennsylvania, have invented certain Improvements in Combined Boring-Tool and Tap, of which the following is a specification:

My invention consists of a boring-tool having one or more sets of cutters, together with a set of adjustable taps, by which a hole in metal may be reamed or bored out, and a screw-thread cut therein at the same time, the tool also being capable of use either for boring or for cutting a thread alone, if desired, as hereinafter explained.

Figure 1 is a side elevation of the tool complete. Fig. 2 is a longitudinal section of the same. Fig. 3 is a transverse section on the line $x\ x$ of Fig. 1, and Fig. 4 is a plan view of the taps or dies with their adjusting-screw detached; Fig. 5, a view of a part detached.

In constructing my tool I provide an arbor or rod, A, and fit thereon a sleeve, B, as shown in Figs. 1 and 3. Through this rod A I make two oblong mortises, intersecting each other at right angles, and in these I fit the cutting-bits C, these latter being halved together or notched at their center, so that, when placed together, as shown in Fig. 2, their front or cutting edges shall all be in the same transverse plane, or nearly so, as represented in Fig. 1. The front end of the sleeve B has recesses cut in it in such positions that when it is shoved up from behind the cutters will fit therein, leaving their outer ends projecting a short distance beyond the periphery of the sleeve B, as shown in Figs. 1 and 2. On a line with the cutters C I cut longitudinal dovetailed grooves in the outer face of the sleeve B, in which to insert cutters $a$, if desired, for boring or reaming out holes or tubes. When used for this purpose, but two such cutters will generally be inserted opposite one another, the intermediate grooves having wooden strips inserted to serve as guides or bearers, to keep the tool steady and prevent it from chattering, as it is usually termed.

It will be understood that these side cutters $a$ may be used with or without the front cutters C, as may be desired, a key being inserted in place of one or both of the front cutters C, to hold the sleeve in place, and prevent it from turning on the rod A.

Through the rod A, near the rear end of the sleeve B, I cut another mortise or slot, to receive the screw-cutting jaws I, as shown in Figs. 2 and 3, there being corresponding notches or slots cut in the rear end of the sleeve B for them to fit in, as shown in Figs. 1 and 2. These jaws I, as shown in Figs. 2 and 4, are made in the form of a letter L, with the cutting-teeth formed on their outer or wider ends, their inner portions being reduced one-half in width, so that when the two are placed together, as represented in Fig. 4, the outer edges of the two will be in the same line, and their inner or adjoining edges will bear and slide one upon the other. In the adjoining edges of each I cut a semicircular recess, so that when the two are placed together these recesses will form a hole, $o$, as shown in Fig. 4, for the adjusting-screw $e$ to enter. As shown in Figs. 2 and 4, these recesses are not cut on a true circle, but are of an oval form, so that when placed together the hole formed by them is oblong, and is diagonal to the plane of the jaws. I then provide a screw, $e$, which has a conical head or body, as shown in Fig. 4, and insert it through a hole made in the sleeve B and the rod A, in such position that it will enter the hole $o$ between the jaws I, as shown in Figs. 2 and 3, so that when the screw is turned down in such a manner as to cause the conical portion to bear on the inclined sides of the hole $o$, it will crowd the jaws out endwise, and thus adjust or set them out to the required extent.

It is obvious that this hole $o$ may be made rectangular or circular, and operate the same, the only difference being in the degree of adjustment.

To lock these jaws I rigidly in position, after they are adjusted I locate an eccentric key, $l$, in a hole in the rod, directly in rear of the jaws I, as shown in Figs. 1 and 2. When this is turned as represented in Fig. 2, it bears hard against the rear edge of the jaws I and locks them fast. At the same time, as these jaws are crowded up against the sleeve in which they fit, it is forced tight against the front cutters C, thus locking all firmly together.

In using the tool, a hole is first bored in the metal, of a size corresponding with the front end of the rod A. The end of the rod being inserted, and motion being given to it, the cutters C, as they rotate, will cut away the metal, and enlarge the hole to a size corresponding to their length; and as there are four cutting or bearing points, the hole thus formed will be smooth and true. As the tool progresses the jaws I will come into operation, and form a screw-thread as they advance.

It is obvious that, when desired, the cutters C may be used alone, for boring out or enlarging a hole, the side cutters a and the jaws I being removed, and a key inserted in place of the latter for the eccentric l to bear against. So, too, the side cutters a may be used to ream out a hole without the cutters C or the jaws I, and in like manner the jaws I may be used with or without the cutters C and a. Thus I produce a tool that can be used for either or all of these purposes, and which is exceedingly useful in metal-working.

By using sleeves of various diameters, it will be seen that several different sets of cutters and taps may be used with the same shaft or rod, and that thus a tool is furnished which is adapted to a much greater range of work than with this class of tools as ordinarily constructed.

Having thus described my invention, what I claim is—

1. The combination of the rod A, sleeve B, and cutters C, all constructed and arranged to operate substantially as described.

2. The L-shaped jaws I, in combination with the rod A and the conical-headed adjusting-screw e, all constructed and arranged to operate substantially as set forth.

3. The combination of the rod A, sleeve B, jaws I, and eccentric l, arranged for joint operation as set forth.

ALEXANDER H. SIEGFRIED.

Witnesses:
   PHILIP T. DODGE,
   J. McKENNEY.